US010790651B2

(12) United States Patent
Okura et al.

(10) Patent No.: US 10,790,651 B2
(45) Date of Patent: Sep. 29, 2020

(54) OPERATION DEVICE

(71) Applicant: Mitsubishi Electric Corporation, Tokyo (JP)

(72) Inventors: Kenichiro Okura, Tokyo (JP); Haruhiko Matoba, Tokyo (JP); Tomoki Okuno, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/465,613

(22) PCT Filed: Jan. 31, 2017

(86) PCT No.: PCT/JP2017/003478
§ 371 (c)(1),
(2) Date: May 31, 2019

(87) PCT Pub. No.: WO2018/142489
PCT Pub. Date: Aug. 9, 2018

(65) Prior Publication Data
US 2019/0341759 A1 Nov. 7, 2019

(51) Int. Cl.
*H05K 5/00* (2006.01)
*H02G 3/08* (2006.01)
(Continued)

(52) U.S. Cl.
CPC ............. *H02G 3/088* (2013.01); *F24F 13/20* (2013.01); *H02G 15/013* (2013.01); *H02G 15/10* (2013.01); *F24F 2013/207* (2013.01)

(58) Field of Classification Search
CPC ....................................................... H05K 5/00
See application file for complete search history.

(56) References Cited

U.S. PATENT DOCUMENTS

| 7,952,886 B2 * | 5/2011 | Mikami | .................. H01R 4/64 174/135 |
| 2015/0289391 A1 * | 10/2015 | Nakatsu | ............... H05K 7/1432 361/796 |

FOREIGN PATENT DOCUMENTS

| JP | H05-322289 A | 12/1993 |
| JP | H07-143582 A | 6/1995 |

(Continued)

OTHER PUBLICATIONS

International Search Report of the International Searching Authority dated Mar. 28, 2017 for the corresponding International application No. PCT/JP2017/003478 (and English translation).

*Primary Examiner* — Jerry Wu
(74) *Attorney, Agent, or Firm* — Posz Law Group, PLC

(57) ABSTRACT

An operation device includes a case, a control board accommodated in the case, and a protective cover for protecting the control board. The protective cover includes a terminal plate, a first dent located on a side of the protective cover opposite to a control board side of the protective cover and having a bottom provided with the terminal, a first groove having a +Z direction end open to the outside of the case through an inlet cutout in the case and a −Z direction end toward an edge of the protective cover opposite to the cutout, and a second groove having an end communicating with the first groove and the other end communicating with the first dent. The other end of the second groove is nearer an edge of the protective cover adjacent to the cutout than the end of the second groove.

15 Claims, 16 Drawing Sheets

(51) Int. Cl.
*F24F 13/20* (2006.01)
*H02G 15/013* (2006.01)
*H02G 15/10* (2006.01)

(56) References Cited

FOREIGN PATENT DOCUMENTS

| | | |
|---|---|---|
| JP | H10-191477 A | 7/1998 |
| JP | 2001-112074 A | 4/2001 |
| JP | 2001-185875 A | 7/2001 |
| JP | 2005-192047 A | 7/2005 |
| JP | 2014-070417 A | 4/2014 |
| JP | 2015-140945 A | 8/2015 |
| WO | 2018/142488 A1 | 8/2018 |

* cited by examiner

OPERATION DEVICE

CROSS REFERENCE TO RELATED APPLICATION

This application is a U.S. national stage application of International Patent Application No. PCT/JP2017/003478 filed on Jan. 31, 2017, the content of which is incorporated herein by reference.

TECHNICAL FIELD

The present disclosure relates to an operation device.

BACKGROUND

An operation device connected to an air conditioner through a signal line is used to remotely operate the air conditioner. This type of operation device may include an operation device body having a plug terminal, and a base having a socket to be joined to the plug terminal of the operation device body for connection to the air conditioner through a signal line (see, for example, Patent Literature 1). The socket having an opening for receiving the plug terminal is located in the end face of a raised portion of the base. The operation device body has a reverse T-shaped groove on a surface to be fitted with the base. To install this operation device on a wall, the base is first fixed to the wall. The operation device body is then mounted on the base by fitting the raised portion of the base partially in the groove of the operation device body and then inserting the plug terminal into the socket. The signal line is guided from the side surface of the raised portion of the base along the vertical portion of the reverse T-shaped groove on the operation device body to above the operation device.

PATENT LITERATURE

Patent Literature 1: Unexamined Japanese Patent Application Kokai Publication No. H10-191477

For the operation device described in Patent Literature 1, when the signal line undergoes surface condensation, water generated on the signal line surface may travel along the signal line into the vertical groove of the operation device body and reach the socket through a gap between the raised portion of the base and the operation device body. The water may corrode the socket or the plug terminal of the operation device body, possibly causing the operation device to malfunction.

In light of the above circumstances, one or more aspects of the present disclosure are directed to an operation device that reduces malfunctioning due to entry of water.

SUMMARY

An operation device according to an aspect of the present disclosure is connectable to an operation target through a signal line to control the operation target by transmitting to the operation target a control signal corresponding to a user operation. The operation device includes a case, a control board, and a protective cover. The case has a box shape, and has a peripheral wall with an inlet to guide the signal line into the case. The control board generates the control signal. The control board includes a circuit board accommodated in the case and an electronic component mounted on the circuit board. The protective cover is located inside the case and separating, inside the case, a first space from a second space to protect the control board. The first space accommodates the control board, and the second space is open to an outside of the case through the inlet. The protective cover includes a terminal, a first dent, a first groove, and a second groove. The terminal is electrically connected to the control board. The first dent is located on a side of the protective cover opposite to a control board side of the protective cover. The first dent has a bottom provided with the terminal. The first groove has a first end that is open to the outside of the case through the inlet in the case and a second end extending toward an edge of the protective cover opposite to the inlet. The first groove receives the signal line. The second groove has a first end communicating with the first groove and a second end communicating with the first dent. The second groove receives the signal line. The second end of the second groove is nearer an edge of the protective cover adjacent to the inlet than the first end of the second groove.

In the operation device according to the above aspect, the protective cover includes the terminal electrically connected to the control board. The first dent of the protective cover is located on a side of the protective cover opposite to the control board side of the protective cover and has the bottom provided with the terminal. The first groove of the protective cover has the first end that is open to the outside of the case through the inlet in the case and the second end extending toward the edge of the protective cover opposite to the inlet. The second groove of the protective cover has the first end communicating with the first groove and the second end communicating with the first dent and receiving the signal line. The second end of the second groove is nearer the edge of the protective cover adjacent to the inlet than the first end of the second groove. Thus, when the operation device is installed with the inlet of the case vertically upward, water entering the first groove through the inlet down the signal line is less likely to flow toward the terminal under gravity acting on the water. In other words, water entering the case through the inlet in the case is less likely to reach and degrade the terminal, thus reducing malfunctioning of the operation device.

DETAILED DESCRIPTION

An operation device according to one or more embodiments of the present disclosure will now be described with reference to the drawings.

Figure 1:
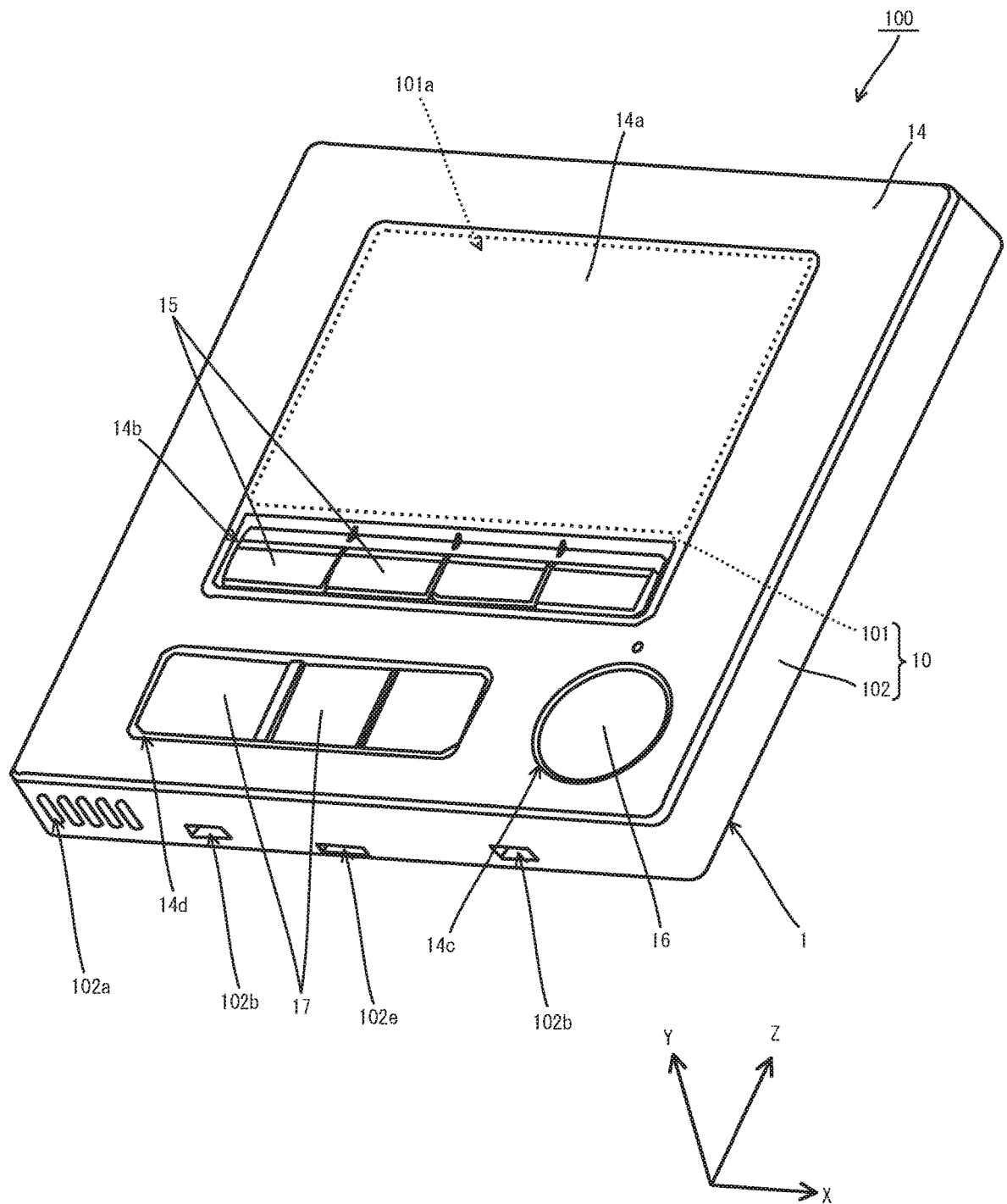
FIG. 1 is an external perspective view of an operation device viewed from the front according to an embodiment of the present disclosure.
Figure 2:
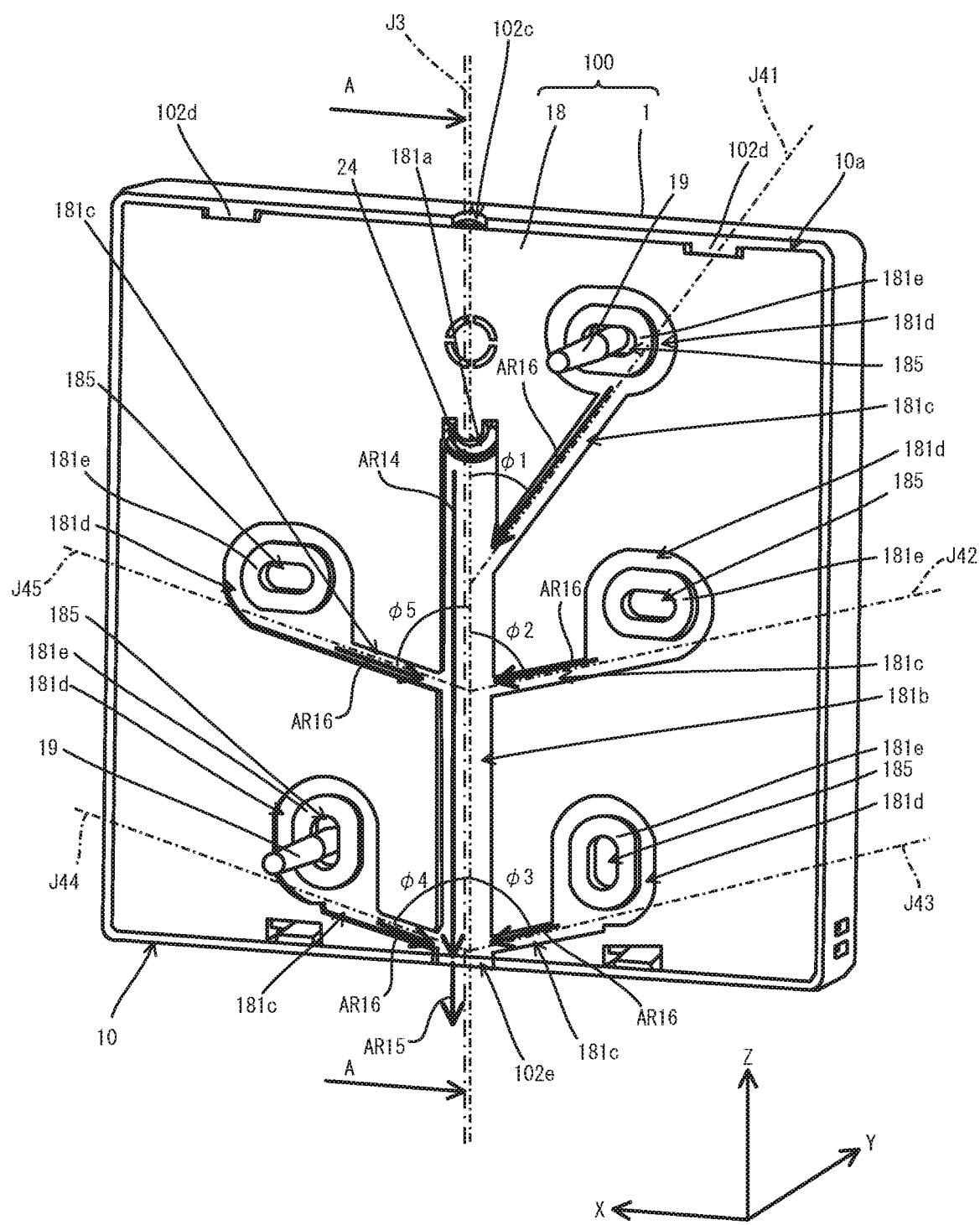
FIG. 2 is an external perspective view of the operation device viewed from the rear according to the embodiment.
Figure 3:
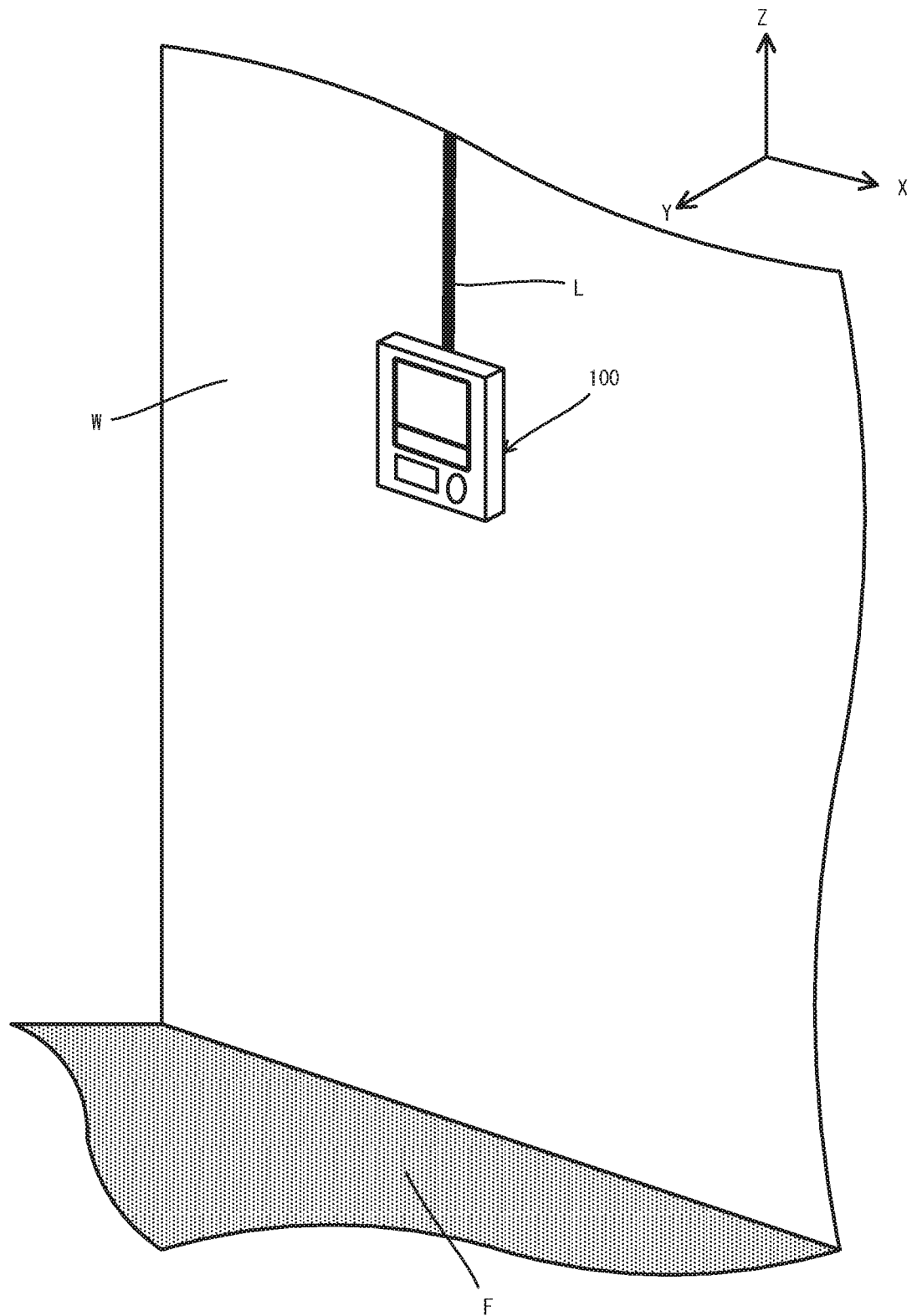
FIG. 3 is a diagram illustrating a wall mounting example of the operation device according to the embodiment.

An operation device according to an embodiment of the present disclosure is installed, for example, on a wall of a building and connected to an operation target, such as an air conditioner (not shown), through a signal line. This operation device controls the operation target by transmitting to the operation target a control signal corresponding to a user operation. As shown in FIGS. 1 and 2, an operation device 100 includes an operation device body 1 and a base member 18 for installing the operation device body 1 on a wall (structural material). As shown in FIG. 3, the operation device 100 is fixed to a wall W, and a signal line L for communication with the air conditioner is connected to an upper end of the operation device 100 that is opposite to a floor (ground) F. Hereinafter, as appropriate, the vertically upward direction (second direction) of the operation device 100 installed on the wall W as shown in FIG. 3 is referred to as a +Z direction, and the vertically downward direction (first direction) of the operation device 100 is referred to as a −Z direction. Further, a direction parallel to the wall W and perpendicular to the vertical direction of the wall W is referred to as an X direction, and a direction orthogonal to the wall W is referred to as a Y direction.

Figure 4:
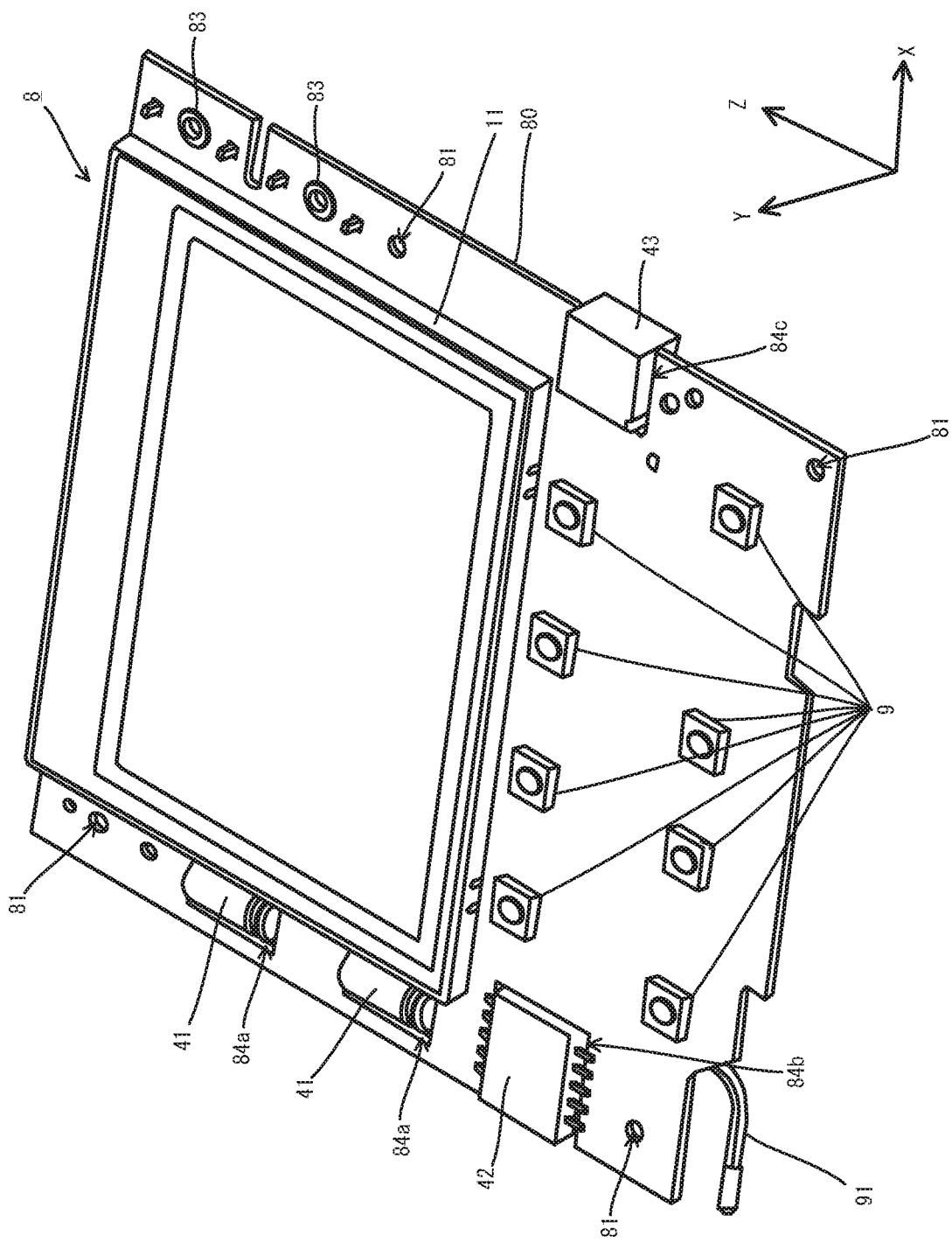
FIG. 4 is a perspective view of a control board viewed from the front according to the embodiment.
Figure 5:
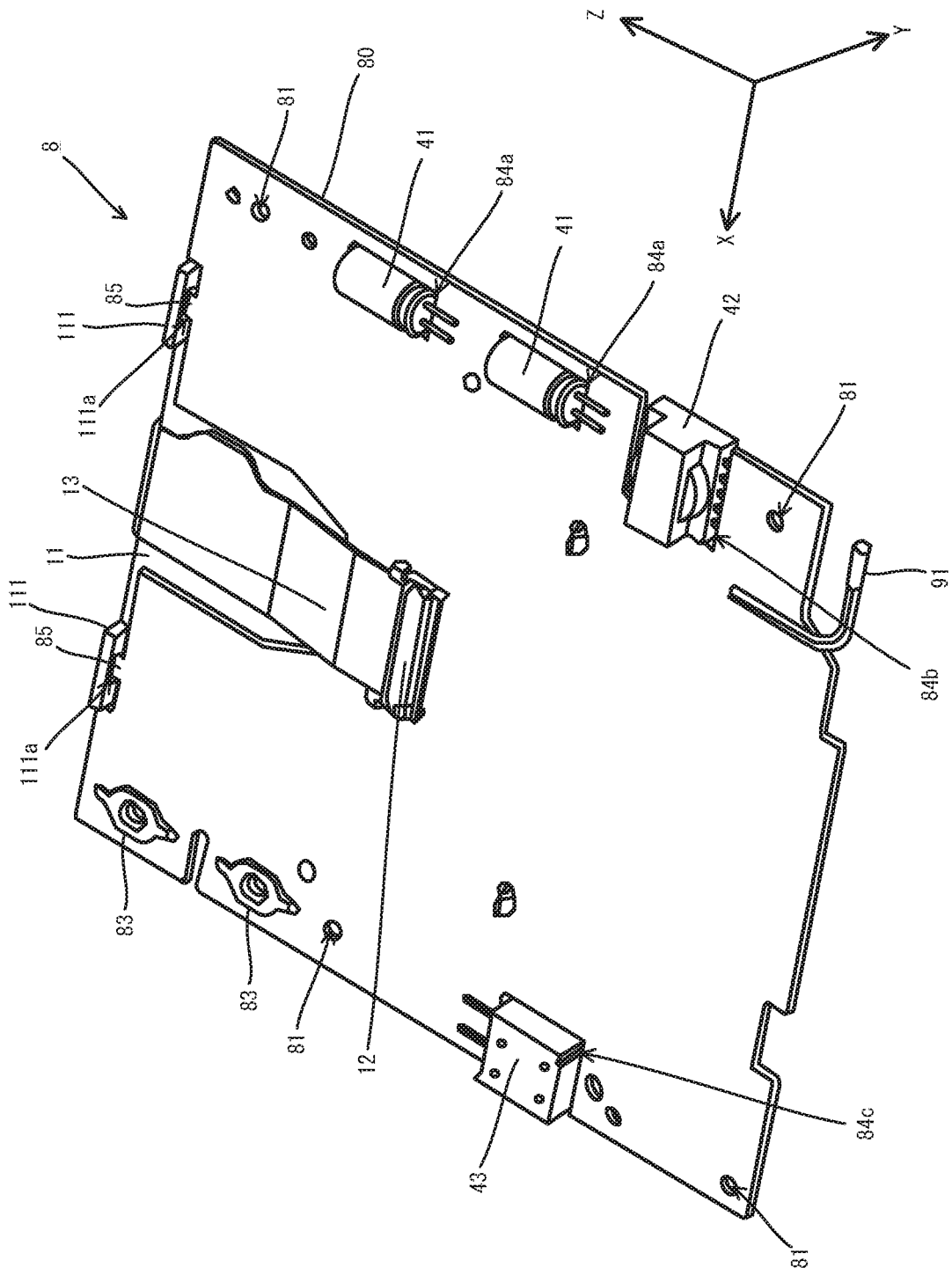
FIG. 5 is a perspective view of the control board viewed from the rear according to the embodiment.
Figure 6:
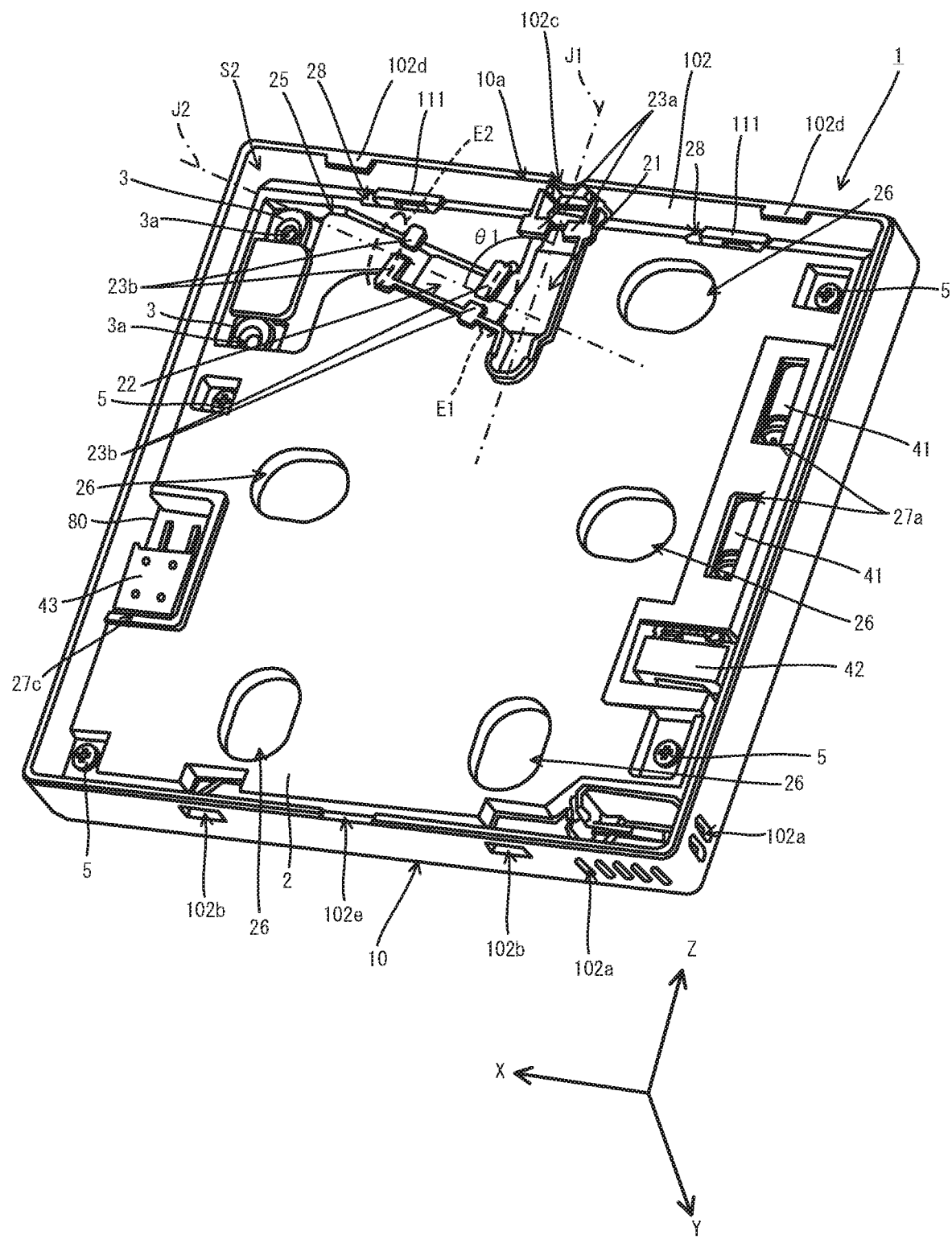
FIG. 6 is a perspective view of an operation device body according to the embodiment.

As shown in FIG. 1, the operation device body 1 includes a case 10 and a front panel 14. The operation device body 1 further includes a control board 8 and a display module 11 as shown in FIGS. 4 and 5. The control board 8 and the display module 11 are accommodated in the case 10. As shown in FIG. 6, the operation device body 1 further includes a protective cover 2 for protection of the control board 8. The protection cover 2 covers the control board 8 on an opening side of the case 10 accommodating the control board 8 and the display module 11.

The case 10 has a shape of a flat rectangular box with an open rear face (in the −Y direction in FIG. 6), and has an inlet cutout 102c, in a side wall 102, for receiving the signal line L inside. More specifically, the side wall 102 of the case 10 at shipment, for example, has a thin portion that is a portion where the inlet cutout 102c having a smaller thickness than other portions. In this case, a worker who installs the operation device 100 cuts the thin portion of the case 10 as appropriate in accordance with the thickness of the signal line L to form the inlet cutout 102c. An opening 10a of the case 10 is covered by the base member 18 when the operation device 100 is installed on the wall W.

Figure 7:
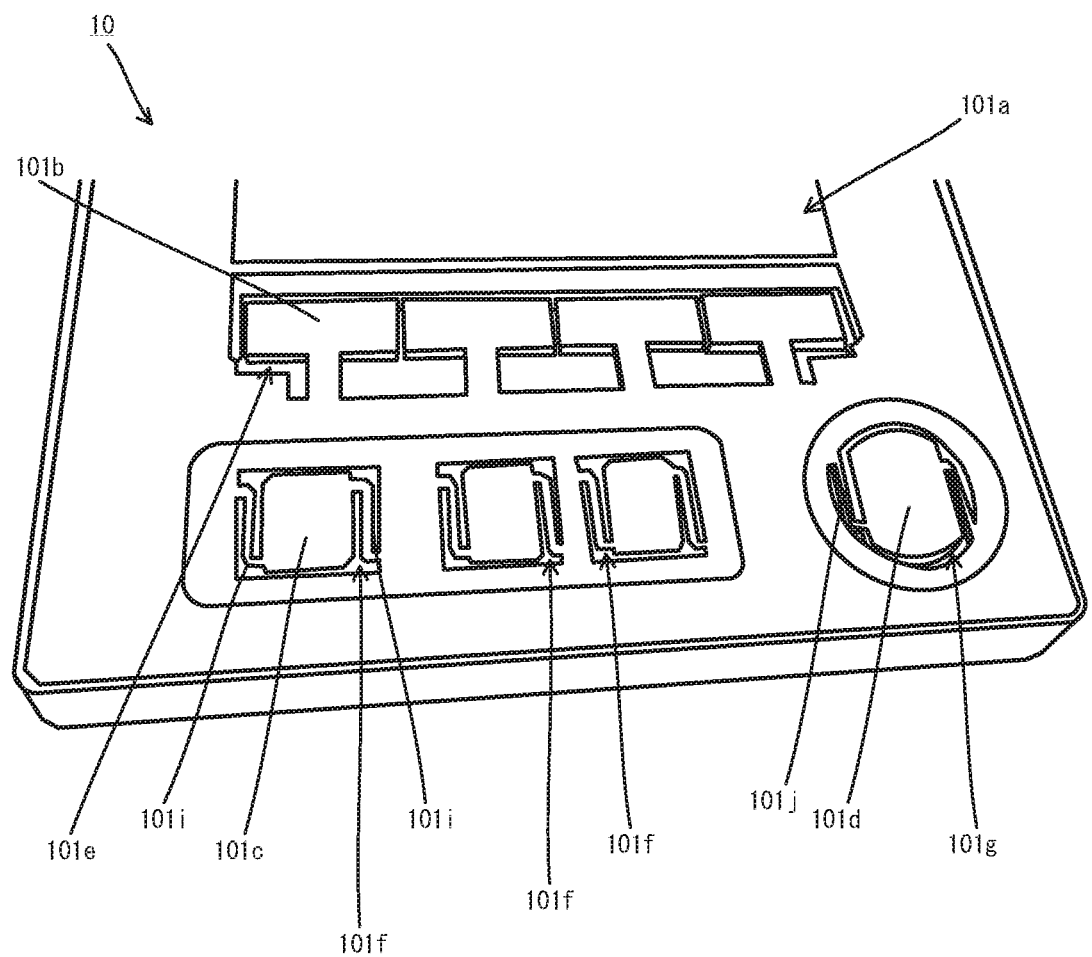
FIG. 7 is a partial perspective view of a case according to the embodiment.

A bottom wall 101 of the case 10 has an opening 101a, which is rectangular in a plan view, for images displayed by the display module 11 to be viewable in front of the case 10. The case 10 has, on the front face, function keys 15, operation keys 17, and a power button 16, which are pressed by a user operating the air conditioner. The operation keys 17 are used, for example, to select an operation command menu for the air conditioner and enter an operation command. As shown in FIG. 7, the bottom wall 101 has mounts 101b, 101c, and 101d, to which the function keys 15, the operation keys 17, and the power button 16 are attached. The mounts 101b, 101c, and 101d connect through flexible portions 101h, 101i, and 101j to the peripheries of openings 101e, 101f, and 101g in the bottom wall 101, respectively. Thus, the function keys 15, the operation keys 17, and the power button 16 attached to the mounts 101b, 101c, and 101d are movable back and forth as the flexible portions 101h, 101i, and 101j bend.

As shown in FIG. 1, the side wall 102 of the case 10 has heat dissipation slits 102a for releasing heat generated inside the case 10 outside, and engagement holes 102b in which the case 10 is engaged with the base member 18. As shown in FIG. 6, the side wall 102 further has, on both sides of the inlet cutout 102c in the X-direction, engagement tabs 102d that protrude in the −Z direction for engagement with the base member 18. The side wall 102 on the −Z direction side further has, in its substantial center, a drain cutout 102e for draining water inside the case 10.

Referring back to FIG. 1, the front panel 14 is a rectangular plate placed over the front side of the bottom wall 101 of the case 10. The front panel 14 includes a transparent portion 14a, which is in a plan view, in an area overlapping the opening 101a in the case 10. The front panel 14 has openings 14b, 14c, and 14d in areas corresponding to the function keys 15, the operation keys 17, and the power button 16 in the bottom wall 101 of the case 10, respectively. The function keys 15, the operation keys 17, and the power button 16 have outer dimensions in a plan view larger than the dimensions of the openings 14b, 14c, and 14d in the front panel 14. The front panel 14 is placed over the front side of the case 10 with the function keys 15, the operation keys 17, and the power button 16 attached to the mounts 101b, 101c, and 101d of the case 10. In this state, the peripheries of the function keys 15, the operation keys 17, and the power button 16 are held between the mounts 101b, 101c, and 101d of the case 10 shown in FIG. 7 and the front panel 14.

The control board 8 is accommodated in the case 10. As shown in FIGS. 4 and 5, the control board 8 includes a circuit board 80 with conductive patterns (not shown), and various electronic components mounted on the circuit board 80, including capacitors 41, a control integrated circuit 42, and a rectifier 43. This control board 8 generates a control signal corresponding to a user operation of pressing the function keys 15, the operation keys 17, or the power button 16. The control board 8 then transmits the generated control signal to the air conditioner through the signal line L. The circuit board 80 includes a plurality of (eight in FIG. 4) push switches 9, the display module 11 for displaying an operation image, and a thermistor 91 for detecting the surrounding temperature of the operation device 100. When the user presses any of the function keys 15, the operation keys 17, and the power button 16, a mount corresponding to the pressed key or button among the mounts 101b, 101c, and 101d on which the keys and buttons are attached moves toward the control board 8, and then contacts and presses the corresponding push switch 9.

The control board 8 further has two signal terminals 83 provided on the circuit board 80 and to be connected to the signal line L. The circuit board 80 has, at the periphery, four through-holes 81 for receiving screws 5 (described later) for fastening the control board 8 to the case 10. The circuit board 80 further has two openings 84a, which are rectangular in a plan view, and cutouts 84b and 84c. The capacitors 41 are received in the openings 84a. The control integrated circuit 42 is received in the cutout 84b. The rectifier 43 is received in the cutout 84c. The control board 8 is thus thinner by the thickness of the circuit board 80 than, for example, a structure having the capacitors 41, the control integrated circuit 42, and the rectifier 43 mounted on the surface of the circuit board 80. As shown in FIG. 5, the circuit board 80 has, at the end of the circuit board 80 in the +Z direction, two protrusions 85 for positioning the display module 11 relative to the circuit board 80.

Figure 8:
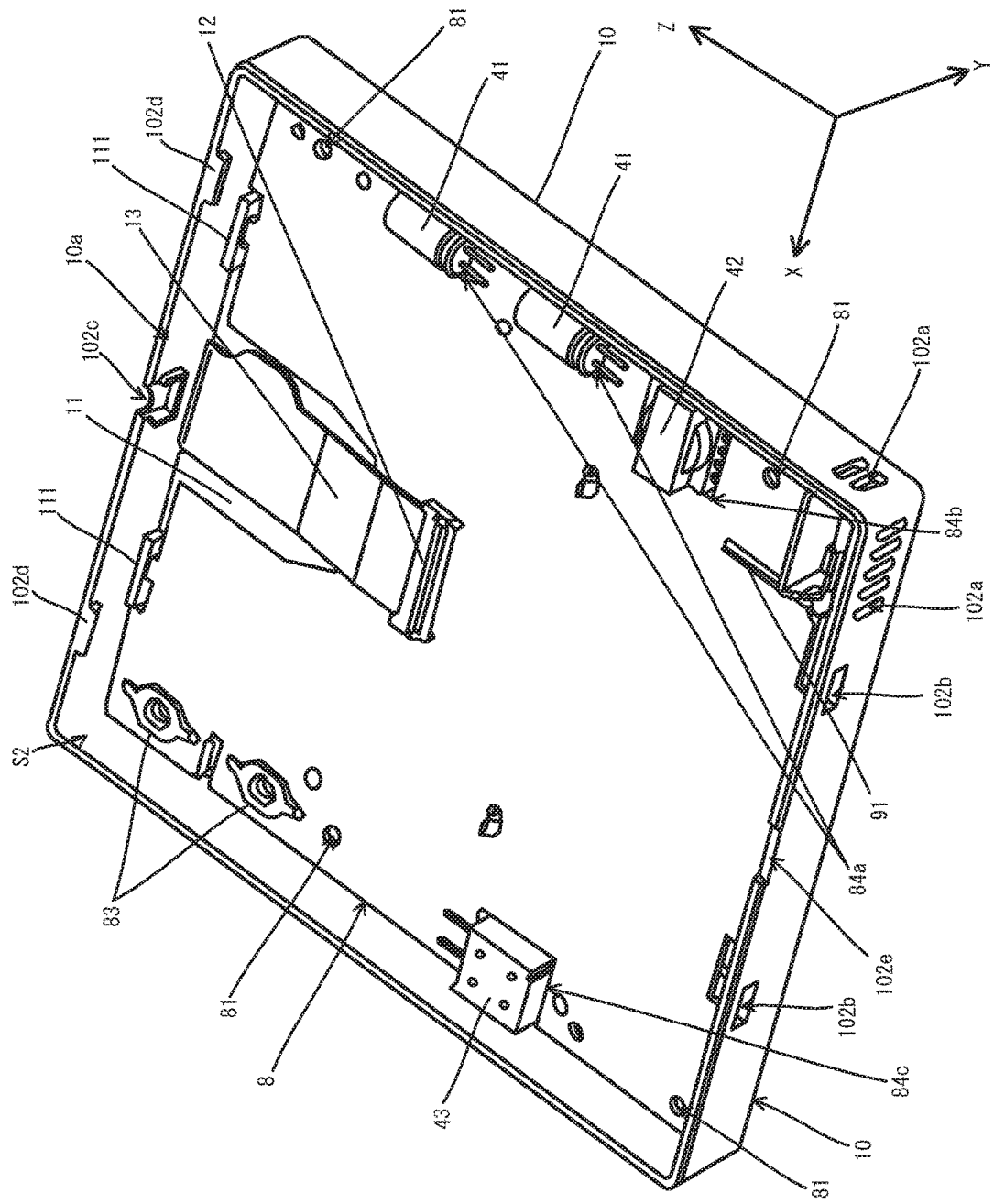
FIG. 8 is a perspective view of the control board according to the embodiment placed inside the case.

The display module 11 displays, for example, the surrounding temperature of the operation device 100 and operation information for operating the air conditioner. The display module 11 is connected to the control board 8 with a connector 12 attached to the tip of a signal cable 13 that is formed from a flexible wiring board. Image information generated by the control board 8 is output to the display module 11 through the connector 12 and the signal cable 13. The display module 11 then displays an image in accordance with the image information generated by the control board 8. The display module 11 has, at the +Z-direction end, two protruding tabs 111 protruding in the −Y direction. Each of the two protruding tabs 111 has a through-hole 111a in the thickness direction. The display module 11 is positioned to be mounted on the control board 8 by fitting the protrusions 85 on the control board 8 in the through-hole 111a in the protruding tab 111. Thus, the display module 11 may be relatively easily positioned when mounted on the control board 8. This facilitates the assembly operation of the operation device 100. As shown in FIG. 8, the control board 8 incorporating the display module 11 is accommodated in the case 10.

Figure 9:
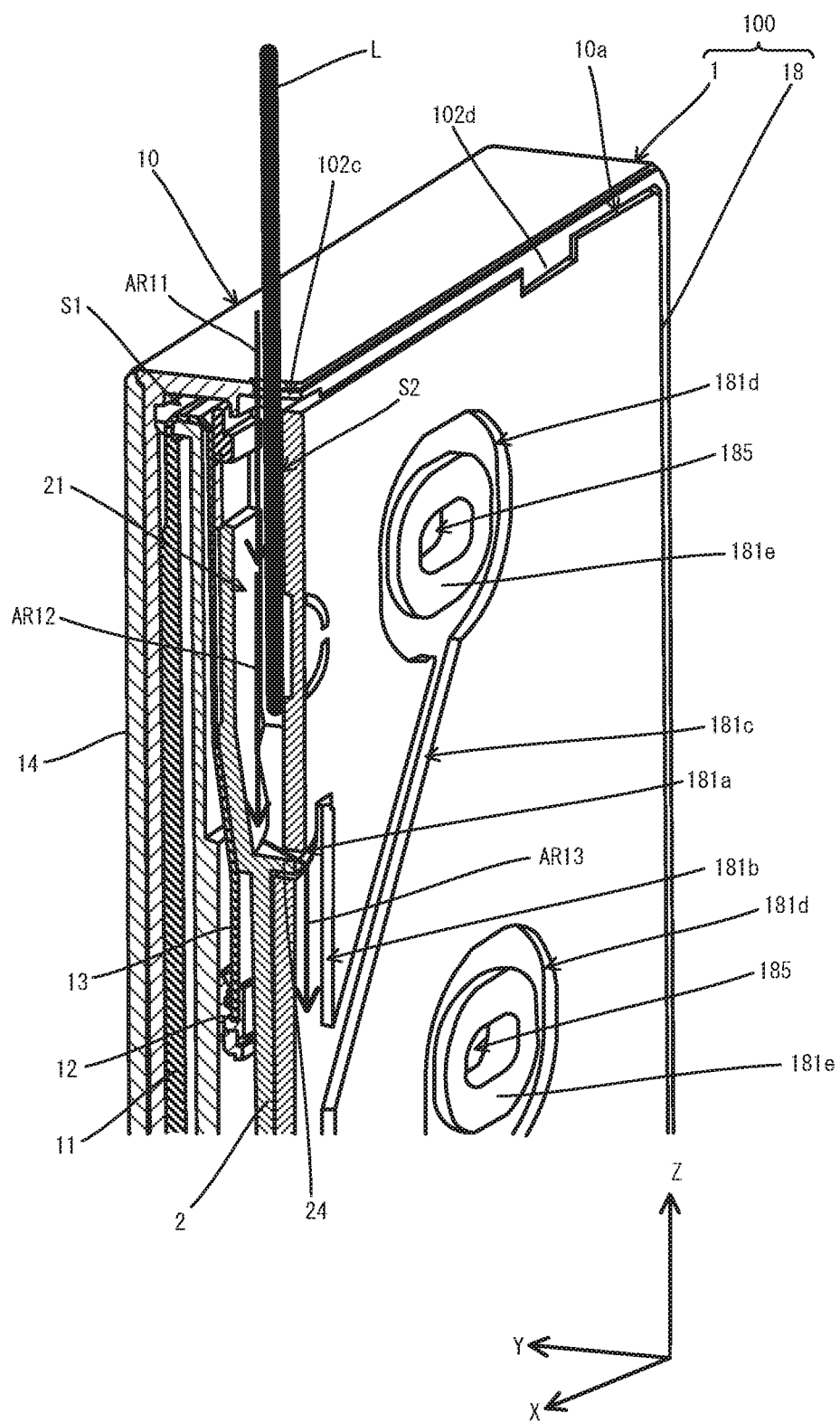
FIG. 9 is a cross-sectional view of the operation device according to the embodiment taken along line A-A indicated by the arrows in FIG. 2.

As shown in FIG. 9, the protective cover 2 is placed inside the case 10 to protect the control board 8 by separating, inside the case 10, a first space S1 for the control board 8 from a second space S2 that is open to the outside of the case 10 through the inlet cutout 102c. As shown in FIG. 6, the protective cover 2 having a shape of a rectangular plate has terminal plates (terminals) 3 electrically connected to the conductive patterns on the circuit board 80. A first dent 25 having a substantially rectangular shape in a plan view is provided in a corner of the protective cover 2 in the +X and +Z directions (in the top-left corner in FIG. 6) on the second space S2 side of the protective cover 2. The first dent 25 has the terminal plates (terminals) 3 at the bottom in areas overlapping the two signal terminals 83 of the control board 8. Each terminal plate 3 has a threaded hole 3a to be screwed with a terminal screw (not shown) for electrically connecting the signal line L to the terminal plates 3. The protective cover 2 further has through-holes (not shown), through which the screws 5 are inserted, in areas overlapping the through-holes 81 in the control board 8. The screws 5 are inserted through these through-holes and the through-holes 81 in the control board 8 and screwed into threaded holes (not shown) in the case 10. This fastens the protective cover 2 and the control board 8 to the case 10.

The protective cover 2 further has a first groove 21 and a second groove 22. The first groove 21 has a +Z-direction end portion open to the outside of the case 10 through the inlet cutout 102c in the case 10, and a −Z-direction end portion extending toward the edge of the protective cover 2 opposite to the inlet cutout 102c, that is, extending in the −Z direction. The second groove 22 has an end portion E1 communicating with the first groove 21 and the other end portion E2 communicating with the first dent 25. The first groove 21 and the second groove 22 receive the signal line L. The first groove 21 and the second groove 22 both extend linearly. The other end portion E2 of the second groove 22 is located nearer the edge of the protective cover 2 on an inlet cutout 102c side of the case 10, that is, in the +Z-direction edge of the protective cover 2, than the end portion E1 of the second groove 22. In other words, the second groove 22 slopes downward, that is, in the −Z direction, along its central axis J2 toward the first groove 21. An angle θ1 between a central axis J1 of the first groove 21 and the central axis J2 of the second groove 22 is set to less than 90°. The −Z-direction end portion of the first groove 21 is curved to have a convex shape in a direction opposite to the inlet cutout 102c in the case 10, that is, in the −Z direction.

The protective cover 2 further has a rib 24 having a U-shape in a plan view and protruding from the outer periphery of the −Z-direction end of the first groove 21 toward the rear side of the protective cover 2, that is, in the −Y direction. This rib 24 extends along the outer periphery of the −Z-direction end of the first groove 21. The central axis J2 of the second groove 22 intersects with the central axis J1 of the first groove 21. The first groove 21 includes a pair of locking tabs 23a at the +Z-direction end of the first groove 21 at a single position. The locking tabs 23a are arranged on both sides of the first groove 21 in the width direction toward the center of the first groove 21 and lock the signal line L received in the first groove 21. The second groove 22 has two pairs of locking tabs 23b at two positions. The paired locking tabs 23b are arranged on both sides of the second groove 22 in the width direction toward the center of the second groove 22 and lock the signal line L received in the second groove 22.

The protective cover 2 further has, in areas overlapping the capacitors 41 mounted on the control board 8, openings 27a having a rectangular shape in a plan view. The openings 27a allow the capacitors 41 to be partially fitted. The protective cover 2 further has cutouts 27b and 27c in areas overlapping the control integrated circuit 42 and the rectifier 43 mounted on the control board 8, respectively. The cutouts 27b and 27c partially receive the control integrated circuit 42 and the rectifier 43. This allows the protective cover 2 to be placed nearer the control board 8 without interfering with the capacitors 41, the control integrated circuit 42, and the rectifier 43. The protective cover 2 further has a plurality of (five in FIG. 6) recesses 26 in which the base member 18 (described below) is partially fitted.

Figure 10:
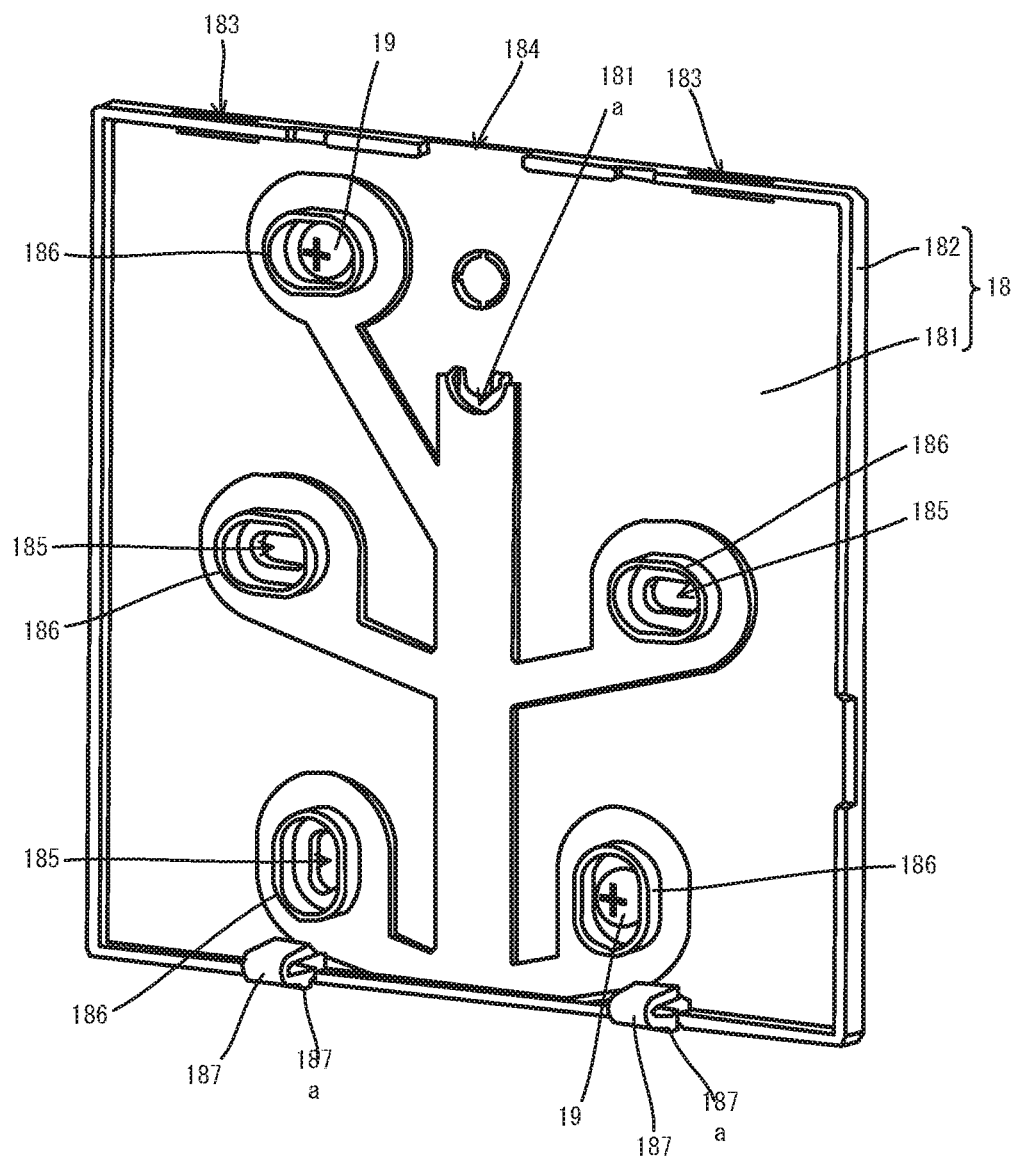
FIG. 10 is a perspective view of a base member included in an operation device according to the embodiment.

The base member 18 is an installation member for installing the case 10 on the wall W. As shown in FIG. 10, the base member 18 includes a rectangular plate bottom wall 181 and a rectangular frame side wall 182 extending from the periphery of the bottom wall 181. The base member 18 has, at its upper end, two engagement holes 183 that extend through the bottom wall 181 and the side wall 182 to be engaged with the engagement tabs 102d on the case 10. The base member 18 further has, at two positions at its lower end, hooks 187 engageable with the engagement holes 102b in the case 10. The side wall 182 has a cutout 184 in an area corresponding to the inlet cutout 102c in the case 10. The bottom wall 181 has five installation holes 185, through which screws 19 are to be inserted to install the base member 18 on the wall W. FIG. 10 shows an example of the base member 18 attached on the wall W with the two screws 19. The installation holes 185, through which the screws 19 are to be inserted, are selected as appropriate in accordance with the installation location of the operation device 100. A device other than the operation device 100 (e.g., a switch box) may be mounted on the base member 18. Each installation hole 185 is surrounded by an annular rib 186. The rib 186 is fitted in the recess 26 of the protective cover 2 when the operation device body 1 is fastened to the base member 18.

As shown in FIGS. 2 and 10, the base member 18 further has a drain hole 181*a* having a U-shape in a plan view. The drain hole 181*a* is a through-hole for draining water generated inside the first groove 21 on the protective cover 2 out of the case 10. As shown in FIG. 2, the drain hole 181*a* is in a portion covering the opening 10*a* of the case 10. The leading edge of the rib 24 of the protective cover 2 is fitted into the drain hole 181*a*. The base member 18 has, on the rear face, second dents 181*d* each surrounding the installation hole 185. This forms an annular seat 181*e* between the installation hole 185 and the second dent 181*d*. The base member 18 further has, on the rear face, a third groove 181*b* and fourth grooves 181*c*. The third groove 181*b* extends from the periphery of the drain hole 181*a* to the edge of the base member 18 opposite to the inlet cutout 102*c* in the case 10 (in the −Z direction). In other words, the third groove 181*b* has an end at the lower end of the base member 18 and the other end communicating with the periphery of the drain hole 181*a*. The fourth groove 181*c* has an end communicating with the third groove 181*b* and the other end communicating with the second dent 181*d*. The third groove 181*b* and the fourth groove 181*c* both extend linearly. The fourth groove 181*c* has the other end nearer the edge of the protective cover 2 adjacent to the inlet cutout 102*c* in the case 10 (in the +Z direction) than the end of the fourth groove 181*c*. In other words, the fourth groove 181*c* slopes downward (in the −Z direction) along its central axis J41, J42, J43, J44, or J45 toward the third groove 181*b*. Angles $\varphi 1$, $\varphi 2$, $\varphi 3$, $\varphi 4$, and $\varphi 5$ between a central axis J3 of the third groove 181*b* and the central axes J41, J42, J43, J44, and J45 of the fourth grooves 181*c* are all less than 90°.

The second dents 181*d*, the third groove 181*b*, and the fourth grooves 181*c* are formed by pressing a base material for the base member 18. Thus, each of the second dents 181*d*, the third groove 181*b*, and the fourth grooves 181*c* has the bottom as thick as the bottom wall 181 excluding the second dents 181*d*, the third groove 181*b*, and the fourth grooves 181*c*. The third groove 181*b* and the fourth grooves 181*c* may have any width. The third groove 181*b* and the fourth grooves 181*c* having smaller widths increase the area in the bottom wall 181 excluding the third groove 181*b* and the fourth grooves 181*c*, thus increasing the area of contact between the base member 18 and the wall W. This structure has a larger heat path for transferring heat generated in the operation device body 1 through the base member 18 to the wall W, thus improving the heat dissipation characteristics.

Figure 11:
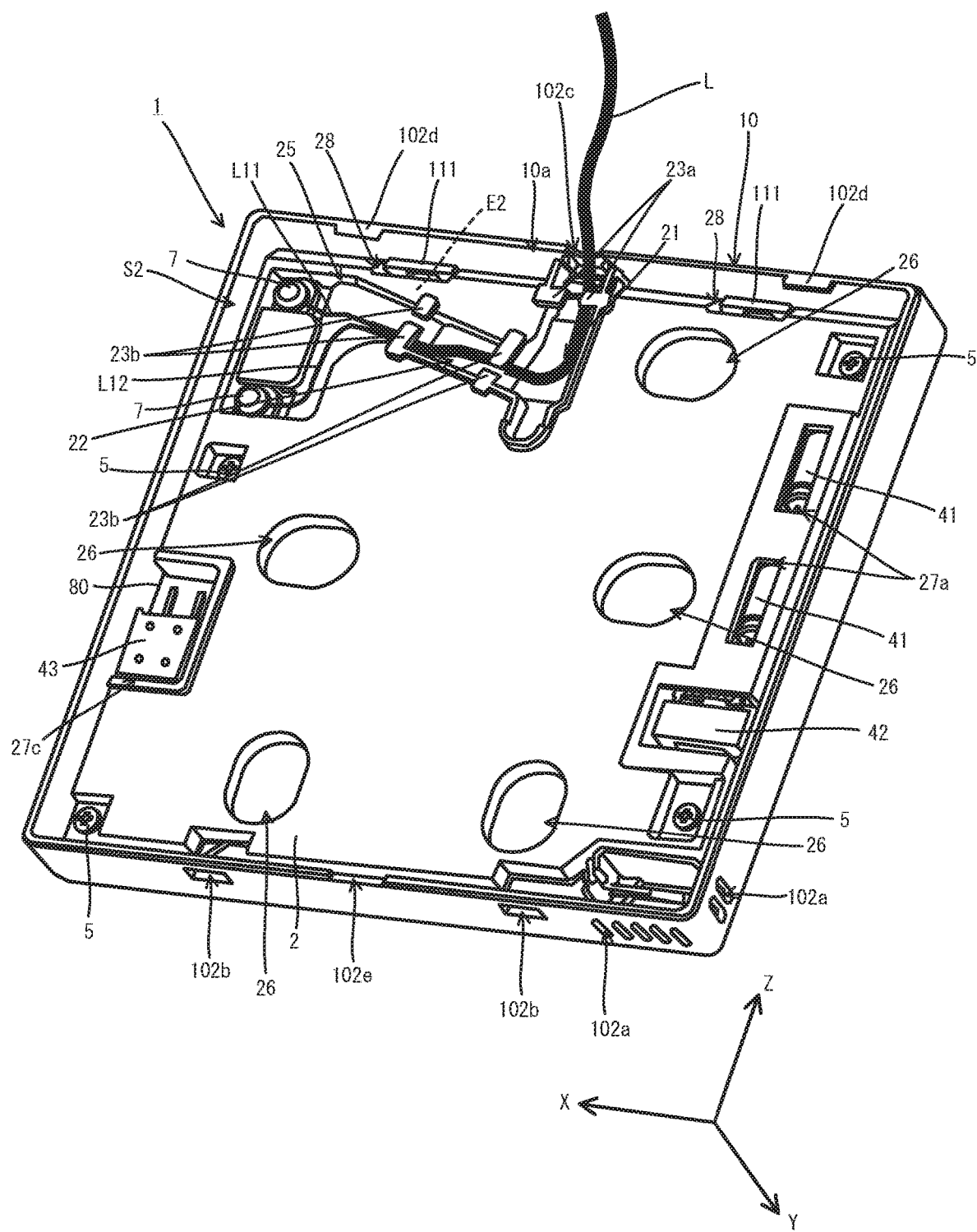
FIG. 11 is a perspective view of the operation device body according to the embodiment, with a signal line fixed to the operation device body.

Next, a procedure for assembling the operation device 100 according to the present embodiment is described. As shown in FIG. 11, the signal line L is guided into the case 10 through the inlet cutout 102*c* in the case 10. The signal line L is then received in the first groove 21 and the second groove 22. More specifically, the signal line L is placed inside the first groove 21 by forcing the signal line L between a pair of locking tabs 23*a* facing each other in the width direction of the first groove 21. Also, the signal line L is placed inside the second groove 22 by forcing the signal line L between two pairs of the locking tabs 23*b* facing each other in the width direction of the second groove 22. Branch lines L11 and L12 at the tip of the signal line L are then each connected to the terminal plate 3 with a terminal screw 7 screwed into the threaded hole 3*a* in the terminal plate 3.

Figure 12:
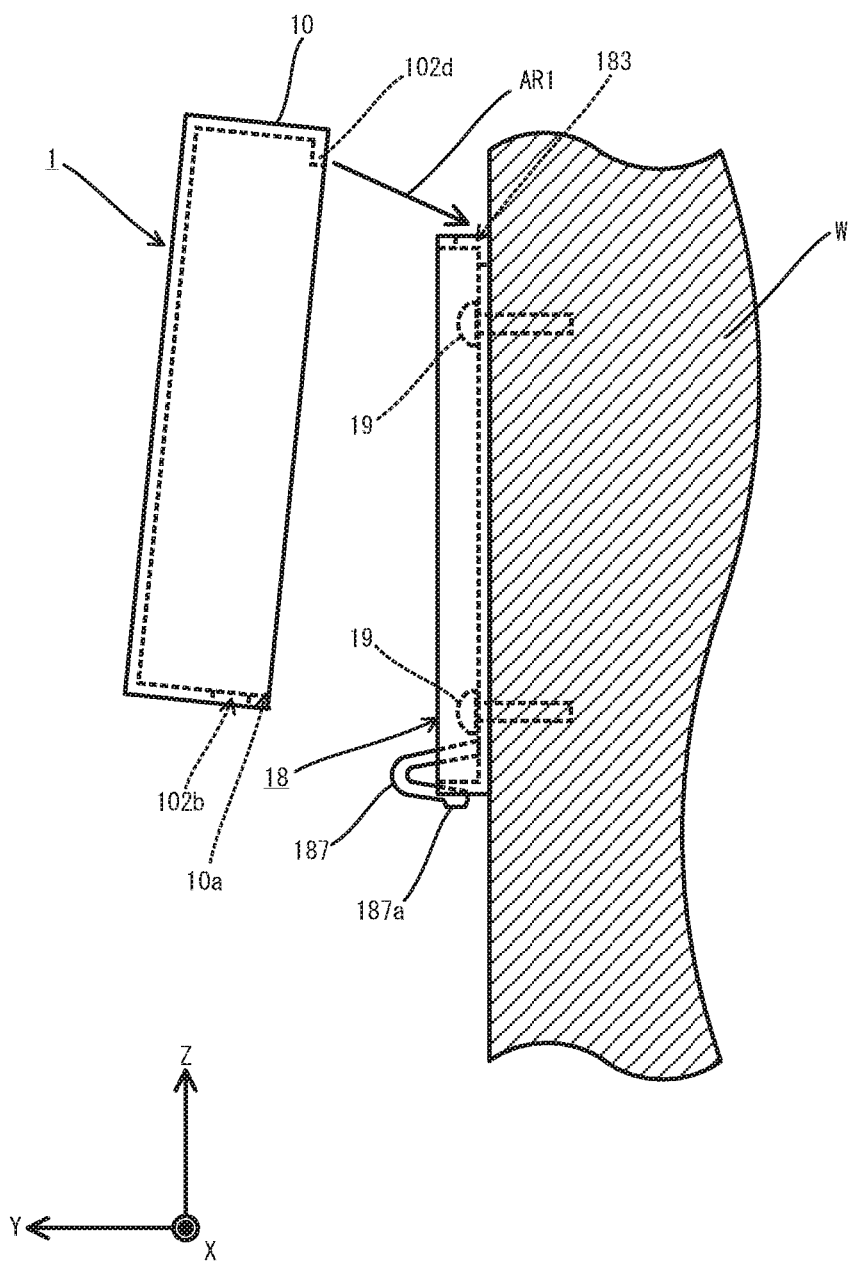
FIG. 12 is a schematic diagram describing the procedure for installing the operation device according to the embodiment.
Figure 13:
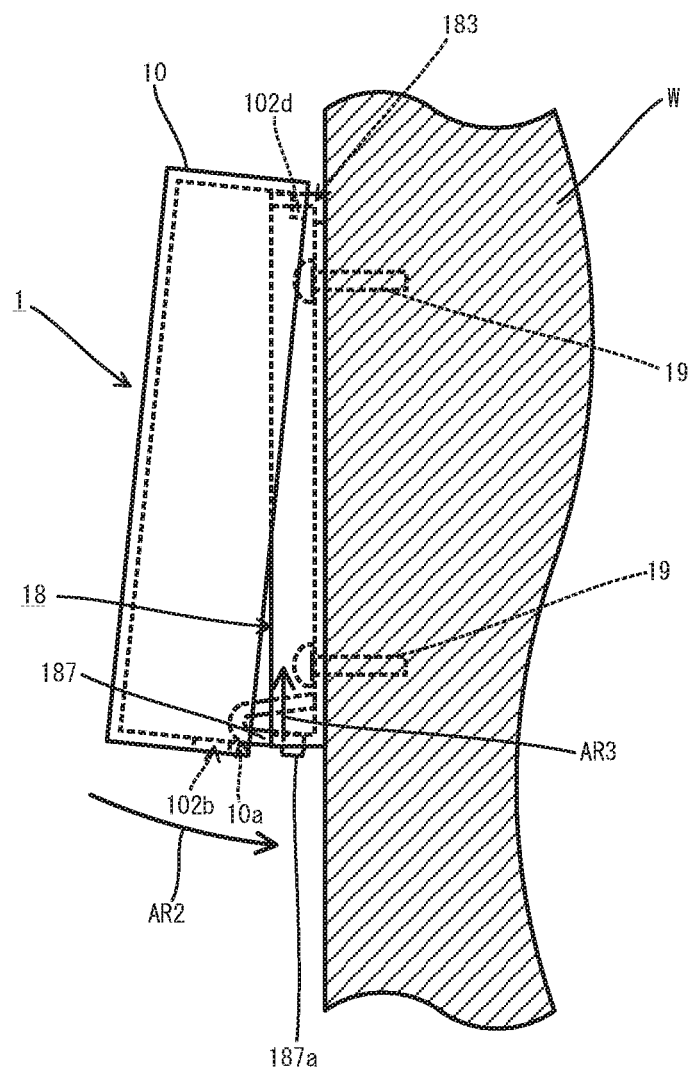
FIG. 13 is a schematic diagram describing the procedure for installing the operation device according to an embodiment.
Figure 14:
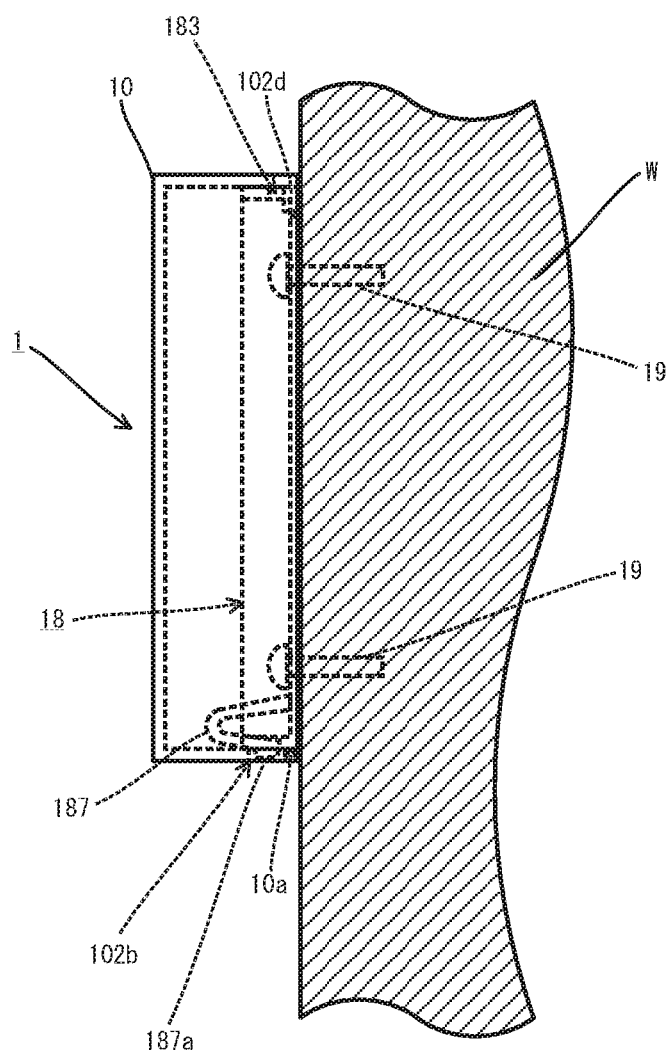
FIG. 14 is a schematic diagram describing the procedure for installing the operation device according to the embodiment.

As shown in FIG. 12, the base member 18 is then attached to the wall W with the screws 19. As indicated by an arrow AR1 in FIG. 12, the engagement tabs 102*d* on the case 10 are then engaged with the engagement holes 183 in the base member 18. The operation device body 1 is hung from the base member 18 as shown in FIG. 13. As indicated by an arrow AR2 in FIG. 13, the case 10 is then rotated about the engagement tabs 102*d* engaged with the engagement holes 183 in the base member 18 until the inner surface of the lower side wall 102 of the case 10 is partially made in contact with the hooks 187 on the base member 18. The case 10 is then further rotated in the direction of the arrow AR2 to bend tips 187*a* of the hooks 187 on the base member 18 upward as indicated by an arrow AR3. As shown in FIG. 14, the engagement holes 102*b* in the case 10 are then engaged with the tips 187*a* of the hooks 187 on the base member 18. This fastens the operation device body 1 to the base member 18.

Next, a drainage path through which water entering the case 10 from outside along the signal line L flows to be drained out of the case 10 in the operation device 100 according to the present embodiment is described. Water resulting from condensation on the surface of the signal line L travels down the signal line L as indicated by an arrow AR11 in FIG. 9 and then enters the first space S1 defined by the first groove 21 on the protective cover 2 and the base member 18 inside the case 10. As indicated by an arrow AR12, the water entering the first space S1 flows along the first groove 21 downward (in the −Z direction) to the lower end of the first groove 21, at which the rib 24 is located. As indicated by an arrow AR13, the water reaching the lower end of the first groove 21 flows through the drain hole 181*a* in the base member 18 to the third groove 181*b* outside the base member 18 along the rib 24. As indicated by an arrow AR14 in FIG. 2, the water reaching the third groove 181*b* flows along the third groove 181*b* to the lower end of the base member 18. The water reaching the lower end of the base member 18 is then drained out of the case 10 through a drain cutout 102*e* in the case 10, as indicated by an arrow AR15.

Next, a drainage path through which water entering the second dent 181*d* on the base member 18 flows to be drained out of the case 10 in the operation device 100 according to the present embodiment is described. Water resulting from, for example, condensation on the screw 19 may flow to the second dent 181*d* through a gap occurring between the seat 181*e* on the base member 18 and the wall W. The water reaching the second dent 181*d* flows along the fourth groove 181*c* to the third groove 181*b* as indicated by arrow AR16 in FIG. 2. As indicated by an arrow AR14 in FIG. 2, the water reaching the third groove 181*b* flows along the third groove 181*b* downward. The water reaching the lower end of the third groove 181*b* is then drained out of the case 10 through the drain cutout 102*e* in the case 10.

As described above, the protective cover 2 of the operation device 100 according to the present embodiment includes the terminals electrically connected to the conductive patterns on the circuit board 80. The protective cover 2 further has the first dent 25, the first groove 21, and the second groove 22. The protective cover 2 has the first dent 25 on the surface opposite to the control board 8 (in the −Y direction). The first dent 25 has the terminal plates 3 on its bottom. The first groove 21 has the +Z direction-end that is open to the outside of the case 10 through the inlet cutout 102*c* in the case 10, and the −Z direction-end extending toward the edge of the protective cover 2 opposite to the inlet cutout 102*c* (in the −Z direction) and receiving the signal line L. The second groove 22 has the end E1 communicating with the first groove 21, and the other end E2 communicating with the first dent 25 and receiving the signal line L. More specifically, the second groove 22 has the end E2 located nearer the edge of the protective cover 2 adjacent to the inlet cutout 102c than the end E1 of the second groove 22. Thus, when the operation device 100 is installed with the inlet cutout 102c in the case 10 vertically upward, water entering the first groove 21 through the inlet cutout 102c down the signal line L is less likely to flow toward the terminal plates 3 under gravity acting on the water. In other words, water entering the case 10 through the inlet cutout 102c in the case 10 is less likely to reach and degrade the terminal plates 3, thus reducing malfunctioning of the operation device 100.

The operation device 100 according to the present embodiment includes the base member 18 for installing the case 10 on the wall W. The case 10 has the opening 10a covered by the base member 18. The base member 18 has the drain hole 181a in a portion covering the opening 10a of the case 10. The protective cover 2 includes the rib 24 protruding from the outer periphery of the −Z-direction end of the first groove 21 and having the leading edge fitted in the drain hole 181a in the base member 18. The water entering the first groove 21 can be drained in a reliable manner along the rib 24 into the third groove 181b on the base member 18.

In the present embodiment, the −Z-direction end of the first groove 21 is curved to have a convex shape toward a side of the case 10 opposite to the inlet cutout 102c in the case 10 (in the −Z direction). The rib 24 is U-shaped in a plan view and extends along the outer periphery of the −Z-direction end of the first groove 21. This allows water entering the first groove 21 to be smoothly drained along the rib 24 into the third groove 181b on the base member 18.

In the present embodiment, the base member 18 has the third groove 181b, which extends from the periphery of the drain hole 181a to the edge of the base member 18 opposite to the inlet cutout 102c in the case 10 (in the −Z direction). This allows water drained to the rear face of the base member 18 to be smoothly drained below the base member 18. This reduces degradation of the base member 18 due to water retained between the base member 18 and the wall W.

The base member 18 in the present embodiment further has the five installation holes 185, the annular second dents 181d, the third groove 181b, and the fourth grooves 181c. The screw 19 for installing the base member 18 on the wall W is inserted through the installation hole 185. The second dent 181d surrounds the installation hole 185. The fourth groove 181c has the end communicating with the third groove 181b and the other end communicating with the second dent 181d. The fourth groove 181c has the other end nearer the edge of the protective cover 2 adjacent to the inlet cutout 102c in the case 10 (in the +Z direction) than the end of the fourth groove 181c. Thus, water drained to the second dent 181d, under force of gravity, flows out to the first groove 181b along the fourth groove 181c and then through the third groove 181b to be drained down from the operation device 100. This reduces degradation of the base member 18 due to water retained between the base member 18 and the wall W.

The circuit board 80 according to the present embodiment has the two openings 84a that are rectangular in a plan view, and the cutouts 84b and 84c. The capacitors 41 are received in the openings 84a. The control integrated circuit 42 is received in the cutout 84b. The rectifier 43 is received in the cutout 84c. The control board 8 is thus thinner by the thickness of the circuit board 80 than, for example, a structure having the capacitors 41, the control integrated circuit 42, and the rectifier 43 mounted on the surface of the circuit board 80. The protective cover 2 has the openings 27a and the cutouts 27b and 27c in areas corresponding to the openings 84a and the cutouts 84b and 84c in the circuit board 80. The capacitors 41 are partially fitted in the openings 27a. Likewise, the control integrated circuit 42 and the rectifier 43 are partially fitted in the cutouts 27b and 27c. This allows the protective cover 2 to be placed near the control board 8 without interfering with the capacitors 41, the control integrated circuit 42, and the rectifier 43. Such arrangement can reduce the thickness of the case 10, thus allowing the operation device 100 to be thinner.

Modifications

Although the embodiment of the present disclosure has been described above, the present disclosure is not limited to the above embodiment. For example, the second groove 22 on the protective cover 2 may extend in a curve as long as the end communicating with the first dent 25 is located nearer the edge of the protective cover 2 adjacent to the inlet cutout 102c in the case 10 (in the +Z direction) than the end communicating with the first groove 21. The fourth groove 181c in the base member 18 may also extend in a curve as long as the end communicating with the second dent 181d is located nearer the edge of the protective cover 2 adjacent to the inlet cutout 102c in the case 10 (in the +Z direction) than the end communicating with the third groove 181b.

Figure 15:
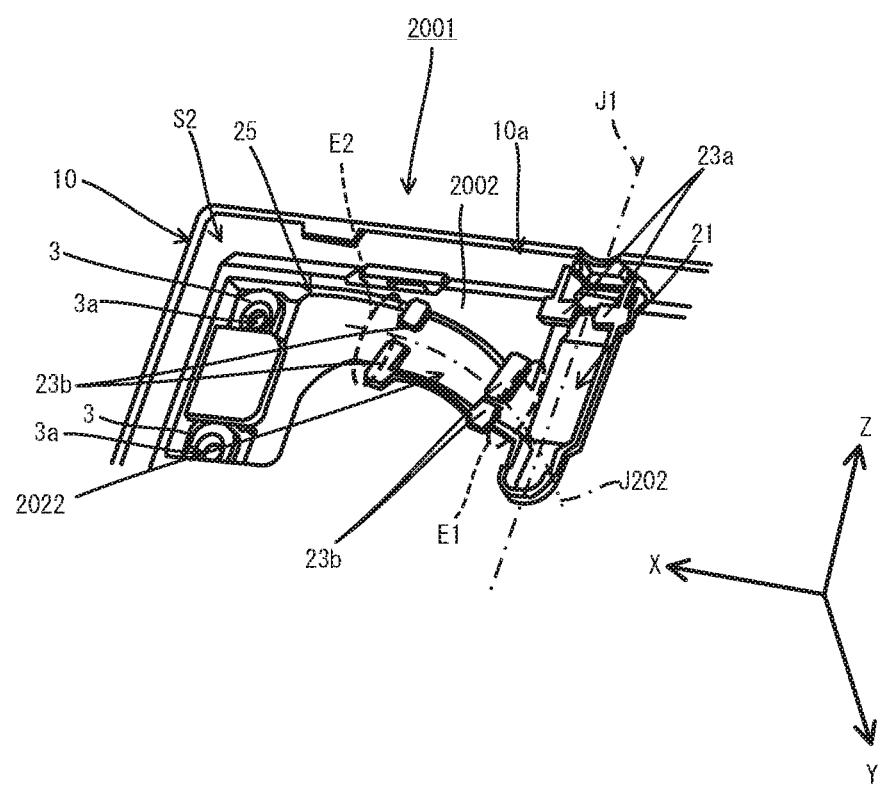
FIG. 15 is a partial perspective view of an operation device body according to a modification.

For example, an operation device body 2001 shown in FIG. 15 may have a second groove 2022 on a protective cover 2002 that is curved to have a convex shape in the +Z direction. In FIG. 15, the same components as in the operation device body 1 according to the embodiment are given the same reference numerals as in FIG. 6. The second groove 2022 has an end E2 communicating with the first dent 25 located nearer the edge of the protective cover 2002 in the +Z direction than the end E1 communicating with the first groove 21. The second groove 2022 has a central axis J202 that is curved to have a convex shape in the +Z direction. This structure allows water entering the first groove 21 to be less likely to enter the second groove 2022.

Figure 16:
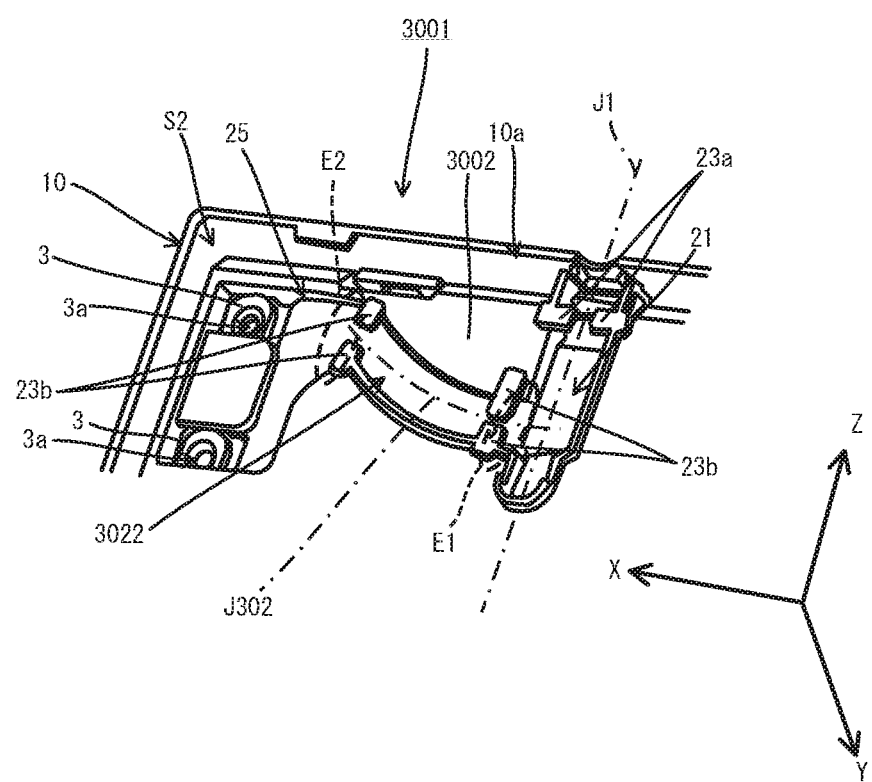
FIG. 16 is a partial perspective view of an operation device body according to a modification.

In some embodiments, a protective cover 3002 may have a second groove 3022 that is curved to have a convex shape in the −Z direction, as in an operation device body 3001 shown in FIG. 16. In FIG. 16, the same components as in the operation device body 1 according to the embodiment are given the same reference numerals as in FIG. 6. The second groove 3022 has an end E2 communicating with the first dent 25 located nearer the edge of the protective cover 3002 in the +Z direction than the end E1 communicating with the first groove 21. The second groove 3022 has a central axis J302 that is curved to have a convex shape in the −Z direction. When the signal line L is routed in the first groove 21 and the second groove 3022 through the inlet cutout 102c in the case 10, this structure allows the signal line L to have a relatively large bending radius, thus reducing distortion applied to the signal line L.

The first groove 21 may also extend in a curve to have a convex shape in the +X direction or the −X direction. In other words, either the first groove or the second groove may extend in a curve.

Although the operation device 100 includes the base member 18 in the above embodiment, the structure may eliminate the base member 18. For example, the operation device body 1 may be installed directly on the wall W without the base member 18.

In the above embodiment, the −Z-direction end of the first groove 21 on the protective cover 2 is curved to have a convex shape in the direction opposite to the inlet cutout 102c in the case 10, that is, in the −Z direction. However, the first groove 21 is not limited to this shape. For example, the first groove 21 may have a −Z direction end extending to the −Z direction edge of the protective cover 2 to be open to the outside of the case 10. In some embodiments, the first groove 21 may have a non-curved end in the −Z direction.

Although the circuit board 80 includes the conductive pattern in the above embodiment, the circuit board 80 may eliminate the conductive pattern. For example, the circuit board 80 may be a circuit board with no conductive pattern, such as a universal board. In this structure, electronic components are mounted on the circuit board by wiring.

Although the operation device is used to operate the air conditioner in the above embodiment, the operation target of the operation device is not limited to an air conditioner and may be other household equipment.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure is suitable for an operation device used in an environment where condensation may occur on the surface of a signal line guided from an operation target.

The invention claimed is:

1. An operation device connectable to an operation target through a signal line to control the operation target by transmitting to the operation target a control signal corresponding to a user operation, the operation device comprising: a case having a box shape and having a peripheral wall with an inlet to guide the signal line into the case; a control board to generate the control signal, the control board including a circuit board accommodated in the case and an electronic component mounted on the circuit board; and a protective cover located inside the case and separating, inside the case, a first space from a second space to protect the control board, the first space accommodating the control board, the second space being open to an outside of the case through the inlet, the protective cover including a terminal electrically connected to the control board; a first dent located on a side of the protective cover opposite to a control board side of the protective cover, the first dent having a bottom provided with the terminal; a first groove having a first end that is open to the outside of the case through the inlet in the case and a second end extending toward an edge of the protective cover opposite to the inlet, the first groove receiving the signal line, and a second groove having a first end communicating with the first groove and a second end communicating with the first dent, the second groove receiving the signal line, the second end of the second groove being nearer an edge of the protective cover adjacent to the inlet than the first end of the second groove; and an installation member to install the case on a structural material, wherein the case has an opening covered by the installation member, the installation member has a through-hole in a portion covering the opening of the case, and the protective cover includes a rib protruding from an outer periphery of the second end of the first groove and having a leading edge fitted into the through-hole.

2. The operation device according to claim 1, wherein the second end of the first groove is curved to have a convex shape in a direction opposite to the inlet in the case, and the rib has a U-shape in a plan view and extends along the outer periphery of the second end of the first groove.

3. The operation device according to claim 1, wherein the installation member has a third groove extending from a periphery of the through-hole to an edge of the installation member opposite to the inlet in the case.

4. The operation device according to claim 3, wherein the installation member has
an installation hole to receive a screw for installing the installation member on the structural material,
a second dent surrounding the installation hole, and
a fourth groove having a first end communicating with the third groove and a second end communicating with the second dent, the second end of the fourth groove being nearer an edge of the protective cover adjacent to the inlet than the first end of the third groove.

5. The operation device according to claim 1, wherein the circuit board has an opening or a cutout to receive the electronic component, and
the protective cover has an opening or a cutout to receive the electronic component in a portion of the protective cover corresponding to the opening or the cutout in the circuit board.

6. An operation device comprising: a case having a box shape; a control board including a circuit board accommodated in the case and an electronic component mounted on the circuit board; and an installation member to install the case on a structural material, the case including an opening covered by the installation member; and a protective cover located inside the case and separating, inside the case, a first space from a second space to protect the control board, the first space accommodating the control board, the second space being open to an outside of the case through the inlet, the protective cover including a terminal electrically connected to the control board; a first dent located on a side of the protective cover opposite to a control board side of the protective cover, the first dent having a bottom provided with the terminal; a first groove having a first end that is open to the outside of the case through the inlet in the case and a second end extending toward an edge of the protective cover opposite to the inlet, the first groove receiving the signal line, and a second groove having a first end communicating with the first groove and a second end communicating with the first dent, the second groove receiving the signal line, the second end of the second groove being nearer an edge of the protective cover adjacent to the inlet than the first end of the second groove; the installation member including an installation hole to receive a screw for installing the installation member on the structural material; a second dent surrounding the installation hole; a third groove extending, in a first direction, to a first-direction edge of the installation member in the first direction; and a fourth groove having a first end communicating with the third groove and a second end communicating with the second dent, the second end of the fourth groove being located nearer a second-direction edge of the installation member in a second direction than the first end of the fourth groove, the second direction being opposite to the first direction.

7. The operation device according to claim 6, wherein the case has a drain cutout in an area corresponding to the first-direction edge of the installation member.

8. The operation device according to claim 2, wherein the installation member has a third groove extending from a periphery of the through-hole to an edge of the installation member opposite to the inlet in the case.

9. The operation device according to claim 8, wherein the installation member has
an installation hole to receive a screw for installing the installation member on the structural material,
a second dent surrounding the installation hole, and
a fourth groove having a first end communicating with the third groove and a second end communicating with the second dent, the second end of the fourth groove being nearer an edge of the protective cover adjacent to the inlet than the first end of the third groove.

10. The operation device according to claim 2, wherein
the circuit board has an opening or a cutout to receive the electronic component, and
the protective cover has an opening or a cutout to receive the electronic component in a portion of the protective cover corresponding to the opening or the cutout in the circuit board.

11. The operation device according to claim 2, wherein
the circuit board has an opening or a cutout to receive the electronic component, and
the protective cover has an opening or a cutout to receive the electronic component in a portion of the protective cover corresponding to the opening or the cutout in the circuit board.

12. The operation device according to claim 3, wherein
the circuit board has an opening or a cutout to receive the electronic component, and
the protective cover has an opening or a cutout to receive the electronic component in a portion of the protective cover corresponding to the opening or the cutout in the circuit board.

13. The operation device according to claim 4, wherein
the circuit board has an opening or a cutout to receive the electronic component, and
the protective cover has an opening or a cutout to receive the electronic component in a portion of the protective cover corresponding to the opening or the cutout in the circuit board.

14. The operation device according to claim 8, wherein
the circuit board has an opening or a cutout to receive the electronic component, and
the protective cover has an opening or a cutout to receive the electronic component in a portion of the protective cover corresponding to the opening or the cutout in the circuit board.

15. The operation device according to claim 9, wherein
the circuit board has an opening or a cutout to receive the electronic component, and
the protective cover has an opening or a cutout to receive the electronic component in a portion of the protective cover corresponding to the opening or the cutout in the circuit board.

* * * * *